(12) United States Patent
Fecko et al.

(10) Patent No.: US 6,572,719 B2
(45) Date of Patent: Jun. 3, 2003

(54) PROCESS AND APPARATUS FOR POSITIONING REINFORCEMENT STRANDS PRIOR TO ENTERING A FORMING DIE

(75) Inventors: David L. Fecko, Granville, OH (US); David V. Stotler, Newark, OH (US); Glen F. Day, Gambier, OH (US); Brent A. Carver, Granville, OH (US)

(73) Assignee: Owens-Corning Fiberglas Technology, Inc., Summit, IL (US)

( * ) Notice: Subject to any disclaimer, the term of this patent is extended or adjusted under 35 U.S.C. 154(b) by 95 days.

(21) Appl. No.: 09/927,977

(22) Filed: Aug. 10, 2001

(65) Prior Publication Data

US 2003/0029547 A1 Feb. 13, 2003

(51) Int. Cl.[7] .......................... B32B 31/00; B29C 70/52
(52) U.S. Cl. ...................... 156/180; 156/158; 156/166; 156/242; 156/245
(58) Field of Search .............................. 156/158, 166, 156/180, 245, 242, 304.1

(56) References Cited

U.S. PATENT DOCUMENTS

| | | |
|---|---|---|
| 3,306,020 A | 2/1967 | Rosenstein |
| 3,339,362 A | 9/1967 | Dodson, Jr. et al. |
| 3,525,207 A | 8/1970 | Irwin |
| 4,002,013 A | 1/1977 | Johnson et al. |
| 4,168,194 A * | 9/1979 | Stiles ........................ 156/180 |
| 4,199,928 A | 4/1980 | Cristaldi |
| 4,292,796 A | 10/1981 | Mima |
| 4,428,992 A | 1/1984 | Street |
| 4,481,056 A * | 11/1984 | Kuhl ......................... 156/180 |
| 4,512,828 A | 4/1985 | Helm |
| 4,803,762 A | 2/1989 | Sheehan |
| 5,044,148 A | 9/1991 | Fujiwara |
| 5,266,139 A | 11/1993 | Yokota et al. |
| 5,534,210 A * | 7/1996 | Shirai et al. ........... 264/171.13 |
| 5,747,075 A | 5/1998 | Gauchel et al. |
| 5,891,284 A | 4/1999 | Woodside et al. |

FOREIGN PATENT DOCUMENTS

EP 0 628 392 12/1994

\* cited by examiner

*Primary Examiner*—Jeff H. Aftergut
(74) *Attorney, Agent, or Firm*—Inger H. Eckert; James J. Dottavio

(57) ABSTRACT

A process and apparatus are provided for positioning a plurality of reinforcement strands including a spliced reinforcement strand in a desired spatial relationship prior to a forming die. The process comprises the steps of: positioning a plurality of uninterrupted reinforcement strands moving toward a forming die so that the uninterrupted strands extend from a first location upstream of the forming die to the forming die in a space-apart converging configuration; and positioning at least one spliced reinforcement strand so that it extends generally centrally through the center of the converging configuration of the uninterrupted strands. The apparatus comprises first and second guide structures.

15 Claims, 4 Drawing Sheets

PROCESS AND APPARATUS FOR POSITIONING REINFORCEMENT STRANDS PRIOR TO ENTERING A FORMING DIE

TECHNICAL FIELD AND INDUSTRIAL APPLICABILITY OF THE INVENTION

The present invention relates generally to a composite forming process such as a pultrusion process and more particularly, to an improved manner of positioning a plurality of reinforcement strands including at least one spliced strand in a desired spatial relationship prior to entering a forming a die.

BACKGROUND OF THE INVENTION

In a conventional pultrusion process, strands are pulled from a plurality of reinforcement input packages, such as glass packages, wetted in a resin bath and fed to one or more shaping dies to form a composite part. For example, 20 packages may be provided on a creel, thus providing 20 strands for the pultrusion process. The creel is positioned ahead of the resin bath. When one package becomes depleted, the operator splices the strand end from the depleted package to the strand end of a new package via a conventional splicing technique, such as an air splice, a glue splice or an overwrap splice. See for example, U.S. Pat. Nos. 4,428,992 and 4,803,762, the disclosures of which are incorporated herein by reference. Typically, the splicing is done while the pultrusion process is ongoing.

In the past, the reinforcement strands, including any spliced strands, ran over a transversely extending cylindrical rod prior to coming together in a bundle and entering a pultrusion die. Thus, the position of any splice in the bundle entering the die varied, depending on the position of the spliced strand relative to the others in the die. In the case where the spliced strand was an "outer" strand, any loose fibers or filaments at the splice oftentimes would catch on an edge of the die, causing those fibers to be stripped back by the die. After fibers catch on the die edge, the process must be stopped.

Alternatively, once a package had been depleted, instead of splicing together fibers from two packages, the pultrusion process is stopped and all packages, including those still having strand material, are replaced. The amount of material initially provided on each of a plurality of packages typically varies. If all packages are replaced when a first package is depleted, strand material remaining on the other packages is scrapped. Hence, this replacement process is undesirable for at least two reasons. First, the process is inefficient as the pultrusion line is stopped during package replacement. Second, the process is costly, due to reinforcement material on the non-depleted packages being scrapped.

Accordingly, there is a need for an improved process and apparatus for splicing together strand ends and positioning the spliced strand at an appropriate location within a bundle of strands prior to the bundle entering a pultrusion-forming die such that fibers or filaments at the splice do not catch on an edge of the die.

SUMMARY OF THE INVENTION

This need is met by the present invention, wherein an improved process and apparatus are provided for centrally positioning a spliced reinforcement strand within a bundle of reinforcement strands entering a forming die. As the splice enters the die, it is surrounded by uninterrupted strand material. Consequently, any loose filaments or fibers at the splice do not contact and become snagged on an edge of the forming die as the splice enters the die. Furthermore, since the splice is located on a central axis of the resulting workpiece, the overall bending strength of that workpiece is enhanced.

In accordance with a first aspect of the present invention, a process is provided for positioning a plurality of reinforcement strands including at least one spliced reinforcement strand in a desired spatial relationship prior to entering a forming die. The process comprises the steps of: positioning a plurality of uninterrupted reinforcement strands moving toward a forming die so that the uninterrupted strands extend from a first location upstream of the forming die to the forming die in a space-apart converging configuration; and positioning at least one spliced reinforcement strand so that it extends generally centrally through the center of the converging configuration of the uninterrupted strands.

The uninterrupted and spliced strands are formed from fibers selected from the group consisting of E-glass fibers, S-glass fibers, graphite fibers, aramid fibers, carbon fibers, metallic fibers and ceramic fibers.

The step of positioning a plurality of uninterrupted reinforcement strands may comprise the steps of providing a jig having a plurality of circumferentially disposed apertures and passing the uninterrupted strands through the apertures. The jig also has at least one aperture for receiving the at least one spliced reinforcement strand. The jig may comprise a plate having eyelets therein which define the plurality of apertures. Alternatively, the jig may comprise a plate having a plurality of open U-shaped members that define the plurality of apertures.

The step of positioning at least one spliced reinforcement strand may comprise the steps of: providing a guide element located along or adjacent to a centerline of the forming die; passing the at least one spliced reinforcement strand through an aperture in the jig; and passing the at least one spliced strand through the guide element after the strand has passed through the jig aperture. The guide element may comprise a rod having an open helical end.

In accordance with a second aspect of the present invention, a pultrusion process is provided. It comprises the steps of: coating a plurality of uninterrupted reinforcement strands and at least one spliced reinforcement strand with a polymeric material; positioning the uninterrupted reinforcement strands so that they extend from a first location upstream of a forming die to the forming die in a space-apart converging configuration; positioning the at least one spliced reinforcement strand so that it extends generally centrally through the center of the converging configuration of the uninterrupted strands; and passing the uninterrupted and spliced strands through the forming die.

The uninterrupted and spliced strands are formed from fibers selected from the group consisting of E-glass fibers, S-glass fibers, graphite fibers, aramid fibers, carbon fibers, metallic fibers and ceramic fibers.

The step of positioning a plurality of uninterrupted reinforcement strands may comprise the steps of providing a jig having a plurality of circumferentially disposed apertures and passing the uninterrupted strands through the apertures. The jig also has at least one aperture for receiving the at least one spliced reinforcement strand. The jig may comprise a plate having eyelets therein which define the plurality of apertures. Alternatively, the jig may comprise a plate having a plurality of open U-shaped members that define the plurality of apertures.

The step of positioning at least one spliced reinforcement strand may comprise the steps of: providing a guide element located adjacent to or along a centerline of the forming die; passing the at least one spliced reinforcement strand through an aperture in the jig; and passing the at least one spliced strand through the guide element after it has passed through the jig aperture. The guide element may comprise a rod having an open helical end.

In accordance with a third aspect of the present invention, an apparatus is provided for positioning a plurality of uninterrupted reinforcement strands and at least one spliced reinforcement strand in a desired spatial relationship prior to entering a forming die. The apparatus comprises first and second guide structures. The first guide structure is positioned at a first location upstream of the forming die for receiving the uninterrupted strands and the at least one spliced reinforcement strand. The uninterrupted strands extend from the first guide structure to the forming die in a space-apart converging configuration. The second guide structure is positioned at a second location between the first location and the forming die for receiving the at least one spliced reinforcement strand from the first guide structure. The second guide structure positions the at least one spliced strand so that it extends generally centrally through the center of the converging configuration of the uninterrupted strands.

The first guide structure may comprise a jig having a plurality of circumferentially disposed apertures for receiving the uninterrupted strands and the at least one spliced strand.

The second guide structure may comprise a guide element positioned adjacent to or along a centerline of the forming die.

DETAILED DESCRIPTION AND PREFERRED EMBODIMENTS OF THE INVENTION

Figure 1:
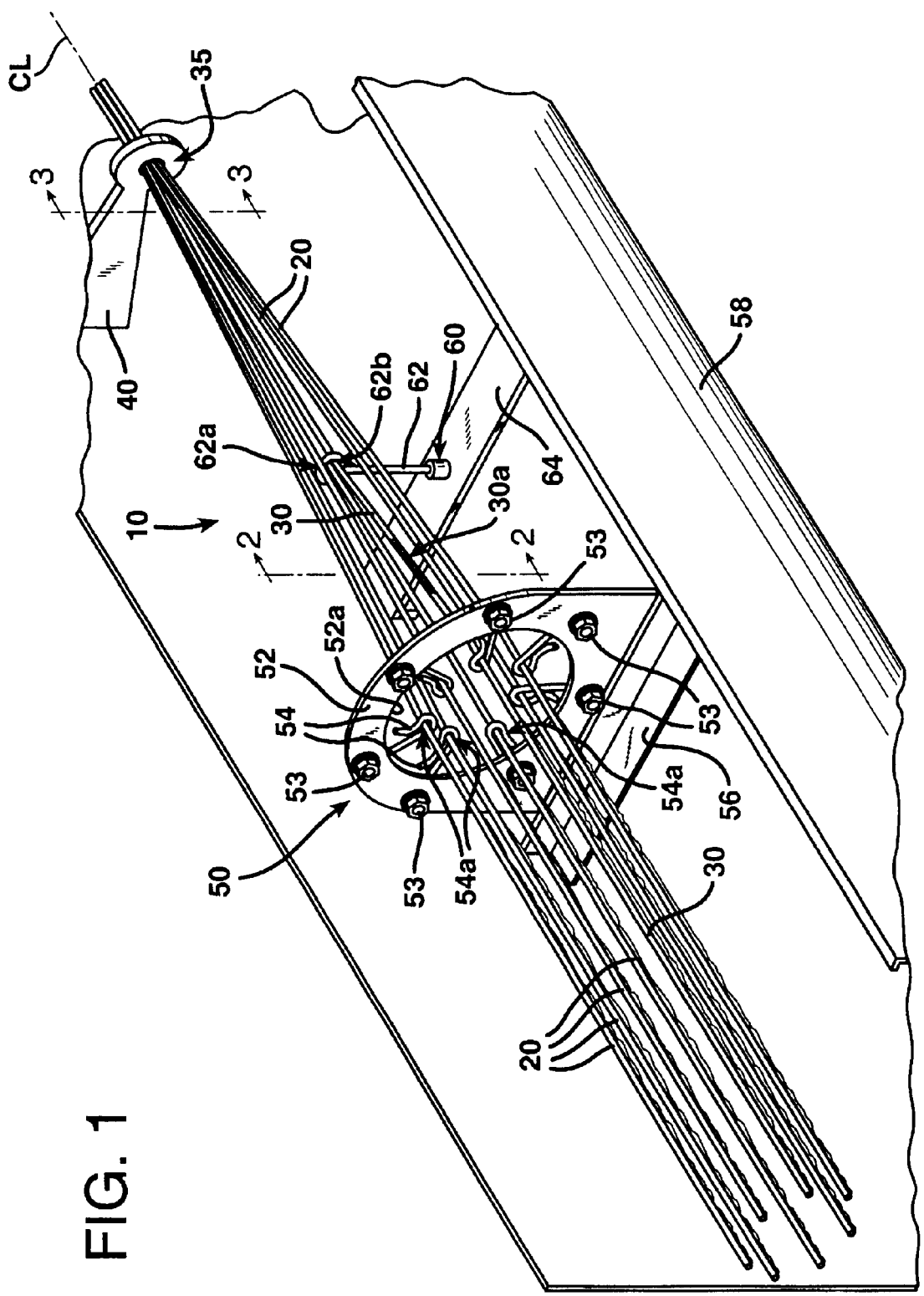
FIG. 1 is a perspective view of apparatus constructed in accordance with a first embodiment of the present invention for positioning a plurality of uninterrupted reinforcement strands and at least one spliced reinforcement strand in a desired spatial relationship prior to a forming die.
Figure 1A:
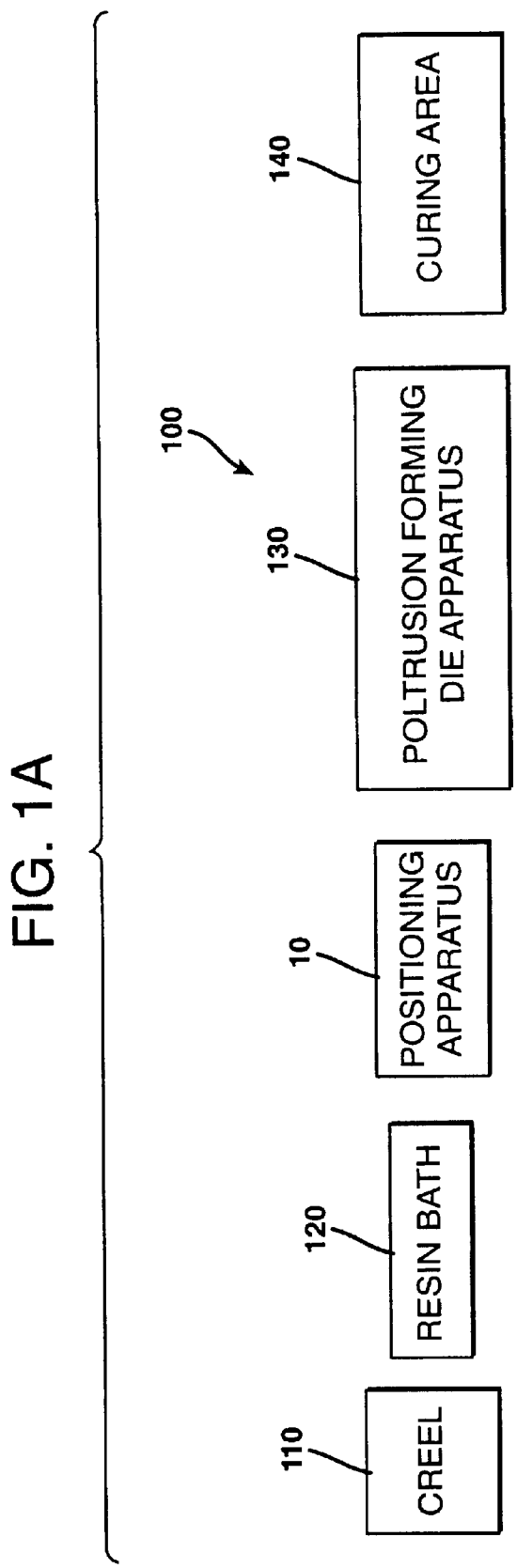
FIG. 1A is a schematic illustration of a pultrusion apparatus in which the apparatus of FIG. 1 may be incorporated.

In FIG. 1, an apparatus 10 is illustrated for positioning a plurality of uninterrupted reinforcement strands 20 and at least one spliced reinforcement strand 30 in a desired spatial relationship prior to entering at least one forming die 40. In the illustrated embodiment, the apparatus 10 and forming die 40 comprise part of a pultrusion apparatus 100, see FIG. 1A, for forming a pultruded product (not shown). The pultrusion apparatus 100 further comprises a creel 110 supporting a plurality of reinforcement input packages (not shown). Each input package may provide one reinforcement strand. Downstream from the creel 100 is a bath 120 containing resin material. The strands pass through and are wetted with the resin material as they pass through the bath 120. The positioning apparatus 10 is located between the bath 120 and a pultrusion forming die apparatus 130. In the illustrated embodiment, the pultrusion die apparatus 130 comprises a series of six spaced-apart dies. A first die 40 is illustrated in FIG. 1. The fibers 20 and 30, after receiving resin material and passing through the positioning apparatus 10, pass through tapered bores within the dies. The entrance of each bore may be circular, rectangular, square or have any other geometric shape. Each succeeding die has a smaller bore than the preceding die. The first die 40 may have tapered bore with an entrance diameter of from about 0.250 inch to about 1.000 inch. Alternatively, less than six or more than six dies may be provided. It is also contemplated that the pultrusion die apparatus 130 may comprise an injection pultrusion die such as the one disclosed in U.S. Pat. No. 5,747,075, the disclosure of which is incorporated herein by reference. Downstream from the pultrusion die apparatus 130 is a curing area 140, comprising an oven provided with ultraviolet lamps. Alternatively, the oven may be provided with infrared lamps.

In accordance with the present invention, just before or when one package on the creel 110 becomes depleted, an operator splices the strand end from the depleted package to the strand end of a new package via a conventional splicing technique, such as an air splice, a glue splice or an overwrap splice. One such splicing technique involves applying a glue comprising cellulose flakes dissolved in acetone to the two ends to be spliced and subsequently twisting those ends together. Before the glue is applied, the ends to be spliced are tapered, i.e., approximately 50% of the strand material is removed from each strand end. Once the glue has cured or solidified, the splice is completed. The splicing technique is conventional and any know technique may be employed. Preferably, the splicing operation is done while the pultrusion process is ongoing.

The positioning apparatus 10 comprises a first guide structure 50 positioned at a first location upstream of the first forming die 40. For example, the first guide structure 50 may be located from about 5 inches to about 24 inches from the first die 40. The first guide structure 50 comprises a plate 52 extending in a generally vertical plane. The plate 52 includes a central bore 52a. A plurality of U-shaped members 54 are coupled to the plate 52 via conventional fasteners 53. One skilled in the art appreciates U-Shaped comprises an open-ended member, and as such could comprise, for example a J-Shape, I-Shape, V-Shape, Flat-shape or any such open-ended member capable of relatively positioning a strand, preferably in two planes. Each U-shaped member 54 has an end portion which defines an aperture 54a. In the illustrated embodiment, seven U-shaped members 54 are provided. However, the number of such members 54 may be less than seven or greater than seven. The apertures 54a extend into the bore 52a and are circumferentially disposed so as to be positioned about an imaginary circle having a diameter of from about 2 to about 10 inches. The uninterrupted and spliced strands 20 and 30, after passing through the resin bath 120, extend through the apertures 54a prior to coming together as a bundle 35 just before they enter into the first forming die 40. Due to the circumferential arrangement of the apertures 54a, the spacing between the first guide structure 50 and the first forming die 40 and the size of the bore in the die 40, the strands 20 extend from the first structure 50 to the forming die 40 in a space-apart converging configuration, see FIG. 1. It is also contemplated that the apertures 54a may be disposed in the shape of a square, rectangle, pentagon, or other similar geometric shape.

The plate 52 is mounted to a bracket 56. The bracket 56 in turn is mounted to a support 58.

An "uninterrupted reinforcement strand" comprises a strand without a splice or a strand including a splice which is located a sufficient distance upstream or downstream from the splice in the spliced strand such that both splices do not pass through the dies substantially simultaneously.

Figure 2:
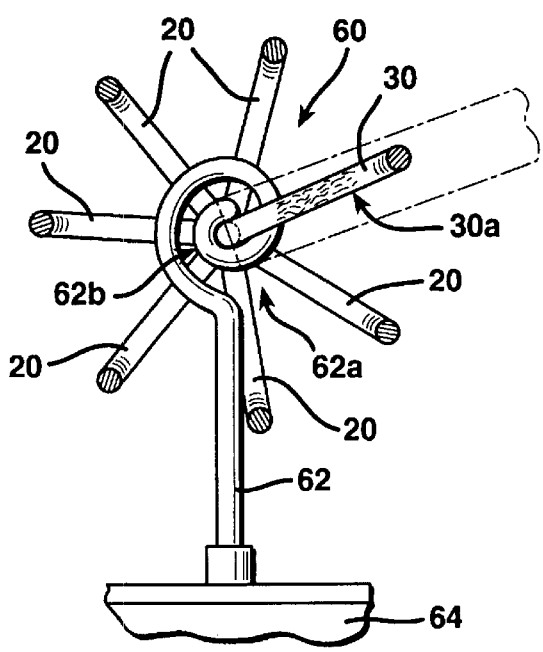
FIG. 2 is a view taken along view line 2—2 in FIG. 1.
Figure 2A:
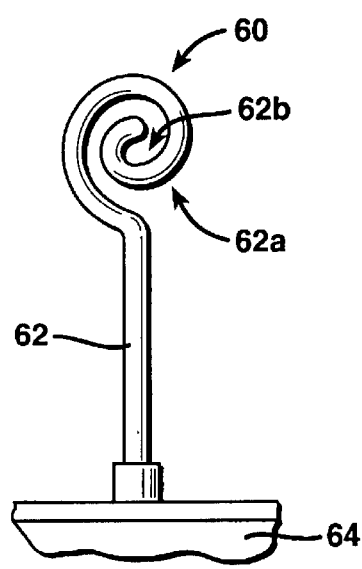
FIG. 2A is a view similar to FIG. 2 but without showing reinforcement strands.

The positioning apparatus 10 preferably further comprises a second guide structure 60, see FIGS. 1, 2, and 2A. It is preferably positioned at a second location between the first guide structure 50 and the forming die 40. For example, the second guide structure 60 may be spaced from about 1 inch to about 15 inches from the first die 40. The second guide structure 60 includes a guide element comprising a rod 62 having an open helical end 62a defining an aperture 62b, see FIGS. 1, 2 and 2A. The aperture 62b is positioned adjacent to or along a centerline CL of the first die 40 and receives the spliced reinforcement strand 30. The rod 62 is coupled to a bracket 64 which, in turn, is coupled to a base of the support 58.

Figure 3:
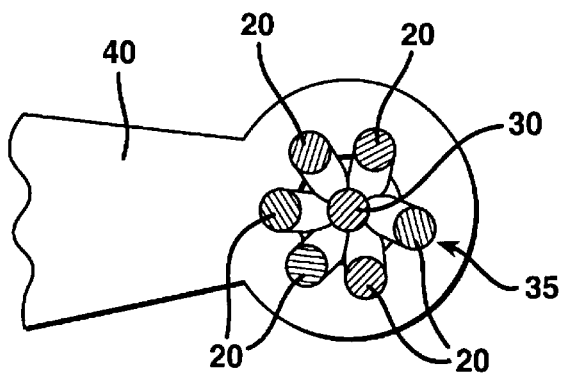
FIG. 3 is a view taken along view line 3—3 in FIG. 1.

Just before a splice 30a in the spliced strand 30 reaches the first die 40, the operator manually positions the strand 30 within the aperture 62b at the rod end 62a. The rod end 62a diverts the spliced strand inwardly of the converging configuration formed by the uninterrupted strands 20 and causes the spliced strand 30 to extend generally centrally through the center of the converging configuration, see FIGS. 1 and 2. Hence, the spliced strand 30 is centrally located in the bundle 35 of strands entering the first die 40, see FIG. 3. Accordingly, any loose filaments or fibers at the splice 30a do not contact and become snagged on an edge of any one of the forming dies as the splice 30a enters and passes through those dies. Furthermore, since the splice 30a is located on a central axis of a resulting workpiece, the overall bending strength of that workpiece is enhanced.

After the splice 30a has passed through the forming dies, the operator manually removes the spliced strand 30 from the aperture 62b.

Alternatively, although not illustrated here, the second guide structure could comprise a portion of the first guide structure 50 shown in FIG. 1. In such an alternative embodiment, one or more of the U-Shaped members 54 is axially moveable with respect to the plate 52, so that the moveable U-Shaped member 54 may be indexed to a position radially inwardly of the other U-Shaped members 43, thereby positioning one of the strands adjacent to or along the centerline CL. In such an alternative embodiment, the second member 60 illustrated in FIG. 1 is not provided independently of the first guide structure. One skilled in the art appreciates that such an axial movement may be accomplished in a number of manners, including a simple linear movement, such as with a linear actuator, cam-operation, or such. Or, alternatively each U-Shaped member is slidably mounted on its fastener 53 so that the member may be manually adjusted radially inwardly. Preferably each of the U-Shaped members are moveable as described in this paragraph, so that any one of, or all of, the strands could be moved to a central position, as desired, without regard to its position about the centerline.

Figure 4:
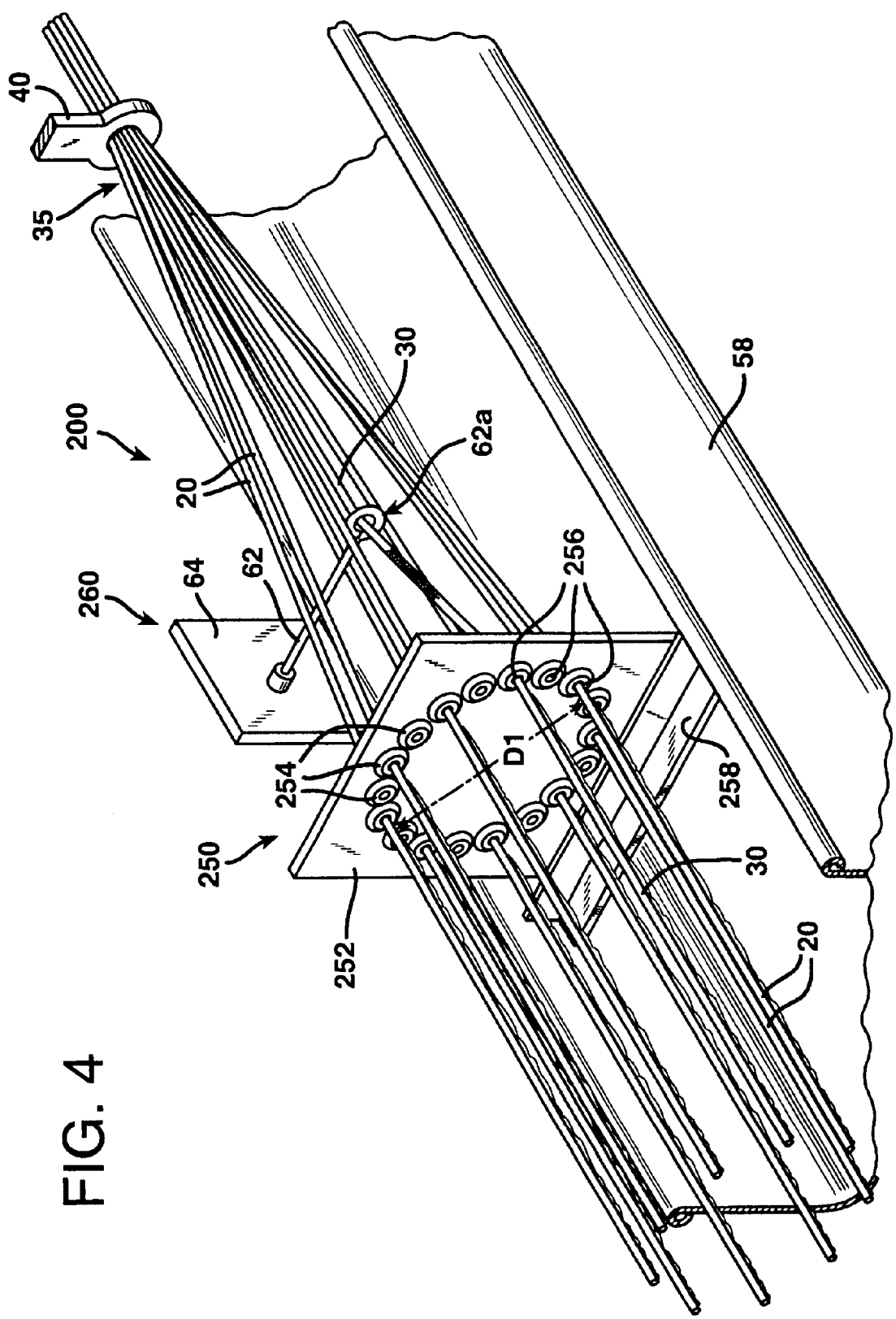
FIG. 4 is a perspective view of apparatus constructed in accordance with a second embodiment of the present invention for positioning a plurality of uninterrupted reinforcement strands and at least one spliced reinforcement strand in a desired spatial relationship prior to a forming die.

A positioning apparatus 200, constructed in accordance with a second embodiment of the present invention, is illustrated in FIG. 4, where like elements are referenced by like numerals. The positioning apparatus 200 comprises a first guide structure 250 positioned at a first location upstream of the first forming die 40. For example, the first guide structure 250 may be located from about 5 inches to about 24 inches from the first die 40. The first guide structure 250 comprises a plate 252 extending in a generally vertical plane. The plate 252 includes a plurality of eyelets 254 which define apertures 256. The apertures 256 are circumferentially disposed so as to be positioned about an imaginary circle having a diameter $D_1$ of from about 2 inches to about 10 inches. The uninterrupted and spliced strands 20 and 30, after passing through the resin bath 120, extend through the apertures 256 prior to coming together as a bundle 35 just before they enter into the first forming die 40. Due to the circumferential arrangement of the apertures 256, the spacing between the first guide structure 250 and the first forming die 40 and the size of the bore in the die 40, the uninterrupted strands 20 extend from the first structure 250 to the forming die 40 in a space-apart converging configuration, see FIG. 4. It is also contemplated that the apertures 256 may be disposed in the shape of a square, rectangle, pentagon, or other similar geometric shape.

The plate 252 is mounted to a bracket 258. The bracket 258 in turn is mounted to a support 58.

The positioning apparatus 200 further comprises a second guide structure 260. It is positioned at a second location between the first guide structure 250 and the forming die 40. For example, the guide structure 260 may be spaced from about 5 inches to about 20 inches from the first die 40. The second guide structure 260 includes a guide element comprising a rod 62 having an open helical end 62a defining an aperture 62b, see FIGS. 2 and 2A. The aperture 62b is positioned adjacent to or along a centerline CL of the first die 40 and receives the spliced reinforcement strand 30. The rod 62 is coupled to a bracket 64 which, in turn, is coupled to a sidewall of the support 58.

It is also contemplated that two or more rods 62, spaced apart along an axis extending centrally through the first guide structure and the first forming die 40, may be provided for receiving a like number of spliced strands so that those strands extend through the center of the converging configuration formed by the uninterrupted strands 20. Hence, the two or more spliced strands are centrally located in the bundle of strands entering the first die 40.

In a further alternative embodiment, although not illustrated here, the second embodiment of FIG. 4 may be modified to provide the apertures 256 within a slot provided in the plate 252, so as to provide for radial movement of one or more apertures and thereby position one or more of the strands at or adjacent to the centerline without a separate second guide as illustrated in FIG. 4.

The foregoing descriptions of embodiments of the present invention are presented for purposes of illustration and description. These descriptions are not intended to be exhaustive or to limit the invention to the precise form disclosed. Obvious modifications or variations are possible in light of the above teachings. The embodiments described were chosen to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A process for positioning a plurality of reinforcement strands including at least one spliced reinforcement strand in a desired spatial relationship prior to entering a forming die comprising the steps of:

positioning a plurality of uninterrupted reinforcement strands moving toward a forming die so that said uninterrupted strands extend from a first location upstream of said forming die to said forming die in a space-apart converging configuration; and positioning at least one spliced reinforcement strand so that it extends generally centrally through the center of the converging configuration of said uninterrupted strands.

2. A process as set forth in claim 1, wherein said uninterrupted and spliced strands are formed from fibers selected from the group consisting of E-glass fibers, S-glass fibers, graphite fibers, aramid fibers, carbon fibers, metallic fibers and ceramic fibers.

3. A process as set forth in claim 1, wherein said step of positioning a plurality of uninterrupted reinforcement strands comprises the steps of providing a jig having a plurality of circumferentially disposed apertures and passing said uninterrupted strands through said apertures, said jig also having at least one aperture for receiving said at least one spliced reinforcement strand.

4. A process as set forth in claim 3, wherein said jig comprises a plate having eyelets therein which define said plurality of apertures.

5. A process as set forth in claim 3, wherein said jig comprises a plate having a plurality of open U-shaped members that define said plurality of apertures.

6. A process as set forth in claim 3, wherein said step of positioning at least one spliced reinforcement strand comprises the steps of:

providing a guide element located adjacent to or along a centerline of said forming die;

passing said at least one spliced reinforcement strand through an aperture in said jig; and passing said at least one spliced strand through said guide element after it has passed through said jig aperture.

7. A process as set forth in claim 6, wherein said guide element comprises a rod having an open helical end.

8. A process as set forth in claim 7, wherein said rod is coupled to a bracket.

9. A pultrusion process comprising the steps of:

coating a plurality of uninterrupted reinforcement strands and at least one spliced reinforcement strand with a polymeric material;

positioning said uninterrupted reinforcement strands so that they extend from a first location upstream of a forming die to said forming die in a space-apart converging configuration;

positioning said at least one spliced reinforcement strand so that it extends generally centrally through the center of the converging configuration of said uninterrupted strands; and passing said strands through said forming die.

10. A pultrusion process as set out in claim 9, wherein said uninterrupted and spliced strands are formed from fibers selected from the group consisting of E-glass fibers, S-glass fibers, graphite fibers, aramid fibers, carbon fibers, metallic fibers and ceramic fibers.

11. A pultrusion process as set forth in claim 9, wherein said step of positioning said plurality of uninterrupted reinforcement strands comprises the steps of providing a jig having a plurality of circumferentially disposed apertures and passing said uninterrupted strands through said apertures, said jig also having at least one aperture for receiving said at least one spliced reinforcement strand.

12. A pultrusion process as set forth in claim 11, wherein said jig comprises a plate having eyelets therein which define said plurality of apertures.

13. A process as set forth in claim 11, wherein said jig comprises a plate having a plurality of open U-shaped members that define said plurality of apertures.

14. A process as set forth in claim 11, wherein said step of positioning said at least one spliced reinforcement strand comprises the steps of:

providing a guide element located adjacent to or along a centerline of said forming die;

passing said at least one spliced reinforcement strand through an aperture in said jig; and passing said at least one spliced strand through said guide element after it has passed through said jig aperture.

15. A process as set forth in claim 14, wherein said guide element comprises a rod having an open helical end.

* * * * *